United States Patent [19]

Bulakhov et al.

[11] 4,250,542

[45] Feb. 10, 1981

[54] METHOD FOR CONTROLLING OPERATING CONDITIONS OF D.C. TRANSMISSION LINE AND CONTROL DEVICE FOR EFFECTING SAME

[76] Inventors: Evgeny K. Bulakhov, Napolny proezd, 12, kv. 114; Igor B. Fedyaev, ulitsa Rashupkina, 7, kv. 175, both of Moscow, U.S.S.R.

[21] Appl. No.: 938,520

[22] Filed: Aug. 31, 1978

[51] Int. Cl.³ ................................................ H02J 3/36
[52] U.S. Cl. ........................................ 363/35; 363/51
[58] Field of Search ................................... 363/35, 51

[56] References Cited

U.S. PATENT DOCUMENTS

| 3,829,756 | 8/1974 | Hockstetter | 363/35 |
| 3,906,335 | 9/1975 | Watanabe et al. | 363/35 |
| 3,949,291 | 4/1976 | Kanngiesser et al. | 363/35 X |

*Primary Examiner*—William M. Shoop
*Attorney, Agent, or Firm*—Steinberg & Raskin

[57] ABSTRACT

A method for controlling the operating conditions of a DC transmission line includes maintaining a predetermined current value at a first substation by controlling the voltage at that substation, while the voltage at a second substation is controlled to maintain an extreme value of a specific controlled variable dependent on the operating conditions at said second substation and formed as a function of parameters which, when reaching an extreme value, ensures a maximum possible voltage at that substation, while maintaining the predetermined current value. The method is effected via a control circuit including a controlled variable former, an adder, an automatic controlled variable optimizer and a control action discriminator.

43 Claims, 10 Drawing Figures

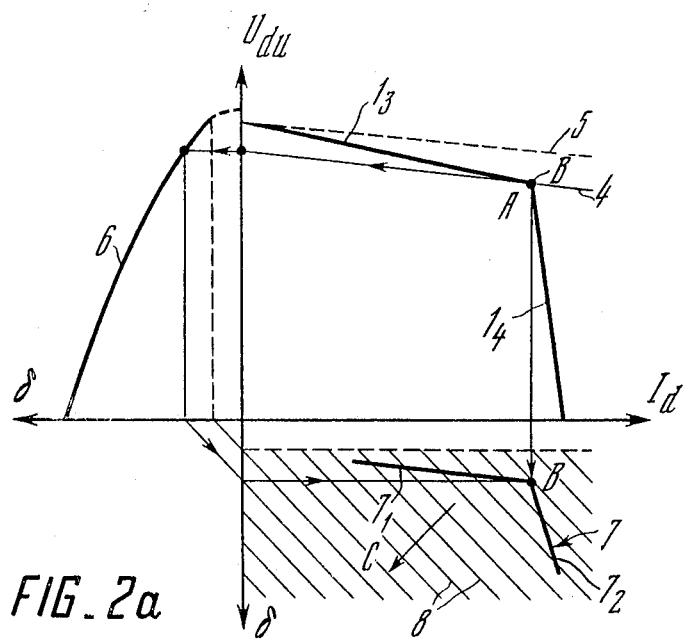
FIG._2a
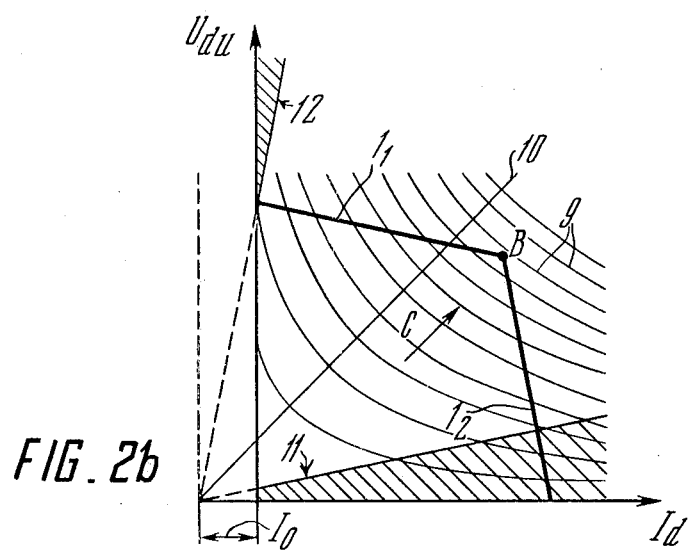
FIG._2b

METHOD FOR CONTROLLING OPERATING CONDITIONS OF D.C. TRANSMISSION LINE AND CONTROL DEVICE FOR EFFECTING SAME

FIELD OF THE INVENTION

The present invention relates to automatic control of extended high-voltage DC transmission lines and, more particularly, to a method and device for controlling operating conditions of a DC transmission line.

The invention is applicable to unipolar and bipolar transmission lines of non-zero lengths, including DC transmission lines incorporating more than two converter substations with gate bridges of the DC substation placed both in series and in parallel.

BACKGROUND OF THE INVENTION

There is known a method for controlling DC transmission lines (cf. The Major Engineering Problems of High-Voltage D.C. Transmission, Developments in Science and Technology, Electrical and Power Engineering, Moscow, 1971), whereby a rectifier substation and an inverter substation are controlled so as to maintain a constant predetermined value of current through the transmission line. If the current exceeds the predetermined value, voltage at the sending end is reduced by increasing the lag angles of the bridges of the rectifier substation; if the current is lower than the predetermined value, voltage at the receiving end is reduced by increasing the lead angles of the bridges of the inverter substation. The method under review provides for protection from excessive current with substations operating at minimum permissible closing angles and thus ensures optimum operating conditions for the transmission line and branch systems. However, protection from excessive current requires the use of telecommunication for coordinated changes of the current settings of current regulators at both substations. On the other hand, a telecommunication channel necessitates considerable investment, keeping in mind great lengths of DC transmission lines and stringent reliability requirements.

There is known another method for controlling DC transmission lines (cf. accepted Japanese Application No. 35734/72, concerned with a system for controlling a high-voltage DC transmission line during evening hours). According to this method, one of the substations is controlled so as to maintain constant voltage, while the other is controlled so as to maintain constant current. There is no need to use telecommunication for effective protection from excessive current, but the end substations operate with closing angles of the converters that are much greater than the minimum possible angles. This is not the best method from the viewpoint of power transmission because it entails substantial power losses, calls for high-power compensation devices and reduces the utilization factor of the equipment.

The aforedescribed accepted Japanese application is further concerned with a DC transmission line comprising a rectifier substation, a system for phase control of the closing angle of the gates of the rectifier substation, a current transducer and a current regulator of said rectifier substation. The DC transmission line includes an inverter substation, a system for phase control of the closing angle of its gates, a voltage transducer and a rectified voltage regulator of the inverter substation.

The control means of the DC transmission line under review suffer from all the disadvantages inherent in the method they are called upon to carry out.

SUMMARY OF THE INVENTION

It is an object of the present invention to provide a method for controlling operating conditions of a DC transmission line, which could be carried out with the aid of low-power equipment and without resorting to data transmission through a telecommunication channel.

It is another object of the invention to provide a control device of a simple design for carrying out the above method.

It is still another object of the invention to provide a method for controlling operating conditions of a DC transmission line, whereby power could be transmitted at a maximum possible voltage.

The foregoing objects are attained by providing a method for controlling operating conditions of a DC transmission line by regulating voltage at its rectifier substation and inverter substation to maintain a predetermined current value so that at the rectifier substation voltage is decreased if current increases above the predetermined value, and increased if current decreases, whereas at the inverter substation voltage is increased if current increases above the predetermined value, and reduced if current decreases, which method consists, according to the invention, in regulating voltage at one of the substations so as to maintain an extreme value of a certain controlled variable dependent on the operating conditions at that substation and formed as a function of parameters which, upon reaching an extreme value, ensures a maximum possible voltage substation, while maintaining the predetermined current value.

It is advisable that voltage at the substation, where an extreme value of the controlled variable is maintained, should be controlled by setting the current at that substation.

The controlled variable may be either a sum total of values proportional to the current and voltage at the substation where an extreme value of the controlled variable is maintained, or a sum total of values proportional to the current or current settling, and to the closing or quenching angle or the closing and quenching angle setting of gates of the substation where an extreme value of the controlled variable is maintained, or a sum total of values proportional to the power and voltage at the substation where an extreme value of the controlled variable is maintained.

For a bipolar DC transmission line operating at a constant load of its half circuits, it is desirable that an extreme value of the controlled variable should be maintained by shifting the external characterstics of the half circuits of the inverter substations by a specific constant value, comparing the controlled variables formed for both half circuits, and using the negative feedback with regard to the difference between the controlled variables, taking into account the shift of the external characteristics.

The objects of the present invention are further attained by providing a control device for controlling the operating conditions of a DC transmission line comprising a phase control system for controlling the closing angle of the inverter substation, which device comprises, in accordance with the invention, a controlled variable former having one of its inputs connected to a current transducer, while its second input receives a signal corresponding to another parameter characterizing the rectified voltage, an adder whose input is connected to an output of the controlled variable former, an automatic controlled variable optimizer whose input is connected to an output of the adder, and a control action discriminator, its input being connected to an output of the automatic controlled variable optimizer, while its outputs are connected to a second input of the adder and an input of the closing angle phase control system of the inverter substation.

It is preferable that the second input of the controlled variable former should be connected to a voltage transducer or a closing angle transducer of the substation where the controlled variable is formed, or to that output of the control action discriminator which is connected to the closing angle phase control system of the substation.

It is expedient that the control device should include a current stabilizing unit comprising a comparator and an error amplifier, an input of the current stabilizing unit being combined with that of the controlled variable former, a current setting input being connected to the output of the automatic controlled variable optimizer, whereas an output of said current stabilizing unit is connected to the input of the control action discriminator.

A current input of the controlled variable former may be connected to the output of the automatic controlled variable optimizer, while the former's output is directly connected to the input of the automatic controlled variable optimizer.

In order to control a bipolar DC transmission line comprising two control half circuits, it is expedient that the control device should include a current stabilizing unit in each half circuit, a control variable former and a control action discriminator in each half circuit, an adder having its inputs connected to outputs of both controlled variable formers, and a current setting former of the half circuits having its input connected to an output of the adder, whereas an output of the current setting former is connected to current setting inputs of both current stabilizing units whose inputs receive DC signals of an equal magnitude and opposite polarity.

The method and device according to the invention make it possible to effectively control and optimize operating conditions of a DC transmission line without using a telecommunication channel.

BRIEF DESCRIPTION OF THE ACCOMPANYING DRAWINGS

Other objects and advantages of the present invention will become more apparent from the following detailed description of preferred embodiments thereof, taken in conjunction with the accompanying drawings, wherein:

FIGS. 1 a and b present external characteristics of a rectifier substation and inverter substation, as well as characteristics of a controlled variable;

FIGS. 2 a and b present external characteristics of a rectifier substation and inverter substation, as well as characteristics of a controlled variable, which serve to determine the control area of the DC transmission line;

FIG. 3 presents the characteristics of FIGS. 2 a and b for a different control law;

DETAILED DESCRIPTION OF THE INVENTION

Figure 1A:
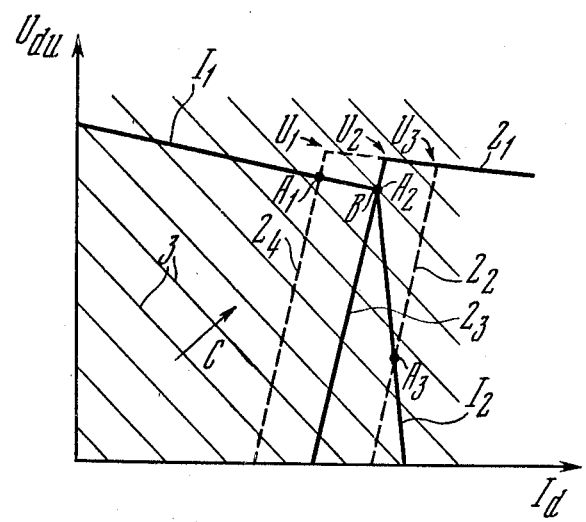

According to the proposed method for controlling operating conditions of a D.C. transmission line, a predetermined current value is maintained at one of the line's gate-type inverter substations, which may be a rectifier or inverter substation, by controlling rectified voltage so that voltage is reduced whenever the current at the rectifier substation exceeds the predetermined value, and increased in cases of an insufficient current, whereas voltage is increased whenever the current at the inverter substation exceeds the predetermined value, and reduced in cases of an insufficient current. As this occurs, voltage is regulated at the other substation so as to maintain an extreme value of a controlled variable dependent on the operating conditions of that substation, which controlled variable, when reaching its extreme value, ensures a maximum possible voltage at the substation, while maintaining the predetermined current value. The line is protected from an excessive current by changing the predetermined current value at the substation controlling the current.

At the substation where an extreme value of the controlled variable is maintained, voltage is controlled by varying the substation closing angle setting and the current setting of a current regulator specially installed at the substation.

Here and elsewhere in the disclosure, the term "setting" is understood to be a predetermined value of an operating parameter of the DC transmission line.

The invention will now be illustrated by an example wherein a predetermined current value is maintained at the rectifier substation, whereas an extreme value of a controlled variable is maintained at the inverter substation.

FIGS. 1 a and b present external characteristics of the substations and characteristics of the controlled variable. The broken line 1 (portions $1_1$ and $1_2$) represents the external characteristic $U_{dB}'(I_d)$ of the rectifier substation and transmission line with an arbitrary current setting value and e.m.f. of the substation and with $U_{dB}' = U_{dU}$, where $U_{dB}'$ is rectified voltage at the rectifier substation;
$I_d$ is rectified current of the transmission line; and
$U_{dU}$ is rectified voltage at the inverter substation.

The portion $1_1$ of the characteristic corresponds to operation of the rectifier substation at a minimum permissible closing angle $\alpha_{min}$, whereas the portion $1_2$ is dependent upon the operation of the current regulator of that substation. The salient point B of the characteristic determines the current setting $I_{yB}$ of the rectifier substation.

The external characteristics $U_{dU}(I_d)$ of the inverter substation operating at a certain e.m.f. value and provided with a current regulator are presented by the broken lines with portions $2_1$, $2_2$, $2_3$ and $2_4$ for three different current settings. The portion $2_1$ corresponds to the operation of the inverter substation at a minimum permissible quenching angle $\delta_{min}$, while the portions $2_2$, $2_3$ and $2_4$ are dependent upon the operation of the current regulator of the inverter substation. The points $U_1$, $U_2$ and $U_3$ determine the current setting $I_{yU}$ of the inverter substation.

The characteristics are plotted in relative units; the base values are rated operating parameters of the rectifier substation.

The operating conditions of the DC transmission line are determined by the point A of intersection of the external characteristics of the substation. The point A is referred to as the working point. By varying the current setting $I_{yU}$ of the inverter substation, one can change the position of the working point A ($A_1$, $A_2$, $A_3$) and thus change the operating conditions of the substation.

The inverter substation is controlled by simultaneously providing for a maximum voltage and a maximum current, for which purpose the controlled variable is formed at that substation as a sum total of values proportional to the voltage and current of the inverter substation:

$$\phi = K_V \frac{V_{dU}}{V_\delta} + K_I \frac{I_{dU}}{I_\delta}, \tag{1}$$

where
$\phi$ is the controlled variable;
$V_{dU}$ and $I_{dU}$ are voltage and current, respectively, of the inverter substation;
$V_\delta$ and $I_\delta$ are base voltage and current values, respectively;
$K_V$ and $K_I$ are proportionality factors to simultaneously convert the voltage and current of the inverter substation to signals of the same scale.

The controlled variable $\phi$ assumes an extreme value when the working point A is matched with the salient point B of the rectifier substation characteristic, for which purpose it is assumed that $K_V=1$ and $K_I=1$. FIG. 1a presents lines 3 corresponding to equal magnitudes of the controlled variable ($\phi$=const). The arrow C indicates the direction of an increase in the values of $\phi$. The lines 3 intersect the portions $1_1$ and $1_2$ and are tangential to the rectifier substation characteristic at the salient point B, whereat the controlled variable $\phi$ has a maximum value.

With a maximum value of $\phi$, the operating conditions of the inverter substation correspond to the characteristic with the salient point $U_2$. In this case the current through the transmission line is equal to the current setting of the rectifier, i.e. $I_d=I_{yB}$, and the rectifier substation operates at a minimum permissible closing angle $\alpha=\alpha_{min}$. Thus, with a current value set by the rectifier substation, voltage at the inverter substation is maintained at a maximum.

Figure 1B:
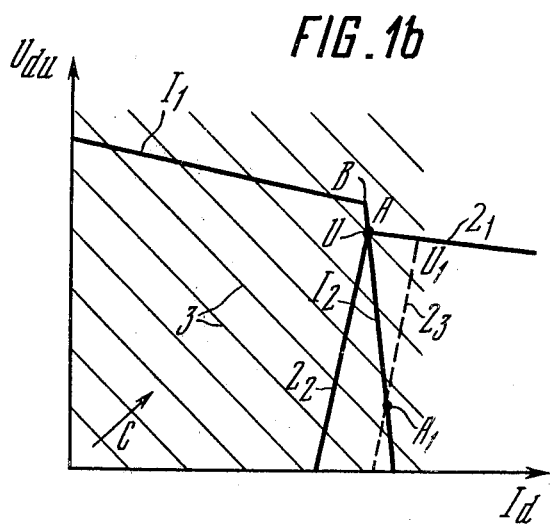

When operating with minimum closing angles, the portion $2_1$ of the inverter substation characteristic may be found at a lower level than the portion $1_1$ of the rectifier substation characteristic, in which case the control process, consisting in setting an extreme value of the controlled variable, is ended upon reaching a minimum permissible quenching angle of the gates of the inverter substation. If this be the case, the working point A is matched with the salient point U of the inverter substation characteristic, as shown in FIG. 1b.

Thus, by varying the extreme value of the controlled variable $\phi$ at the inverter substation, one can ensure optimum operating conditions of the transmission line, and the line is protected from an excessive current solely by varying the current setting at the rectifier substation, without resorting to a telecommunication channel. Power losses are kept at a minimum.

The controlled variable $\phi$ may be formed in different ways, as illustrated by the following examples.

FIGS. 2 a and b present the external characteristic $V_{dB}(I_d)$ (the broken line with portions $1_3$ and $1_4$) of the rectifier substation at a certain fixed current setting and e.m.g. of the substation. FIGS. 2 a and b also present characteristics 4 and 5 of the inverter substation operating at a constant quenching angle, $\delta$=const, and at a minimum quenching angle, $\delta=\delta_{min}$, as well as a characteristic 6 of the inverter substation, which presents the relation between the e.m.f. of the substation and the quenching angle of its gates. The characteristic 6 is plotted in relative units as a cosine curve, the base angle being $\delta_\delta=(\pi/2)$. By using the characteristic 6, one can plot the external characteristic of the rectifier substation in the coordinates $\delta_1 I_d$ as a characteristic 7 with the salient point B.

The inverter substation is controlled by simultaneously providing for a minimum quenching angle of its gates and a maximum current value, for which purpose the controlled variable $\phi$ is formed as the difference of values proportional to the quenching angle and current:

$$\phi = K_\delta \frac{\delta_U}{\delta_\delta} - K_I \frac{I_{dU}}{I_\delta}, \tag{2}$$

where
$\delta_U$ and $I_{dU}$ are the quenching angle of the gates and the current of the inverter substation, respectively;
$\delta_\delta$ and $I_\delta$ are the base angle and current values, respectively;
$K_\delta$ and $K_I$ are proportionally factors to simultaneously convert the quenching angle and current values to signals of the same scale.

The values of $K_\delta$ and $K_I$ are selected so that according to Equation (2), lines 8 representing equal magnitudes of $\phi$ ($\phi$=const) intersect both portions $7_1$ and $7_2$ of a characteristic 7 and are tangential thereto at the point B (the arrow C indicates the direction of an increase in the value of $\phi$).

The controlled variable $\phi$ is at its minimum when the working point A is matched with the salient point B of the characteristic 7 of the rectifier substation.

In Equation (2) the quenching angle and current values may be replaced by those of the angle and current settings, in which case the inverter substation is controlled on the same principle.

Consider a case when in the course of controlling the inverter substation a maximum voltage is reached at a maximum inverted power level, and when the controlled variable formed as a sum total of values proportional to the inverter substation voltage and power:

$$\phi = K_V \frac{V_{dU}}{V_\delta} + K_P \frac{P_{dU}}{P_\delta}, \tag{3}$$

where
$V_{dU}$ and $P_{dU}$ are the voltage and power, respectively, of the inverter substation;
$V_\delta$ and $P_\delta$ are base voltage and power values, respectively;

$K_V$ and $K_p$ are proportionality factors to simultaneously convert the voltage and power values to signals of the same dimension.

FIG. 2b shows an external characteristic 1 [$V_{dB}(I_d)$] of the rectifier substation with portions $1_1$ and $1_2$, plotted at certain arbitrary current and e.m.f. values, as well as lines 9 corresponding to equal values of the controlled variable in accordance with Equation (3); the proportionality factors are selected as follows:

$K_V = I_o$, and $K_p = 1$, where $I_o$ = const.

The lines 9 are hyperbolic lines, whereof an axis of symmetry 10 is drawn from the point having the coordinate ($-I_o$) and lying on the axis $I_d$. The arrow C indicates the direction of the increase in the value of $\phi$.

In the foregoing example, the optimizing control area of the inverter substation is confined within lines 11 and 12; the maximum value of the controlled variable $\phi$ in the shaded area does not correspond to the salient point B of the characteristic 1 of the rectifier substation.

The lines 11 and 12 are characterized by slope coefficients which are equal to the slope coefficients of the portions $1_1$ and $1_2$ of the rectifier substation characteristic, but are of the opposite sign. It is assumed that the slope coefficients of the portions $1_1$ and $1_2$ are constant and independent of the current and voltage settings.

The proportionality factors $K_V$ and $K_p$ are selected so that normal operating conditions of the DC transmission line should be found in the area where the control with reference to the controlled variable $\phi$ indeed optimizes the operating conditions of the inverter substation according to Equation (3).

The ways in which the controlled variable can be formed are not limited to Equations (1), (2) and (3). The controlled variable can be formed on the basis of different operating parameters of the DC transmission line, provided that equivalent results are produced.

It must also be pointed out that the invention is applicable to both unipolar and bipolar DC transmission lines, as well as to lines incorporating more than two inverter substations.

An inverter or rectifier substation of a bipolar DC transmission line is controlled by shifting the external characteristics of the half circuits of one of the substations by a certain constant value, whereupon the controlled variables of the half circuits are compared to each other, and the negative feedback is used on the basis of the difference thus produced and with due regard for the shift of the characteristic of the substation's half circuits.

It is assumed that both half circuits operate in normal conditions and at equal current levels.

Figure 3:
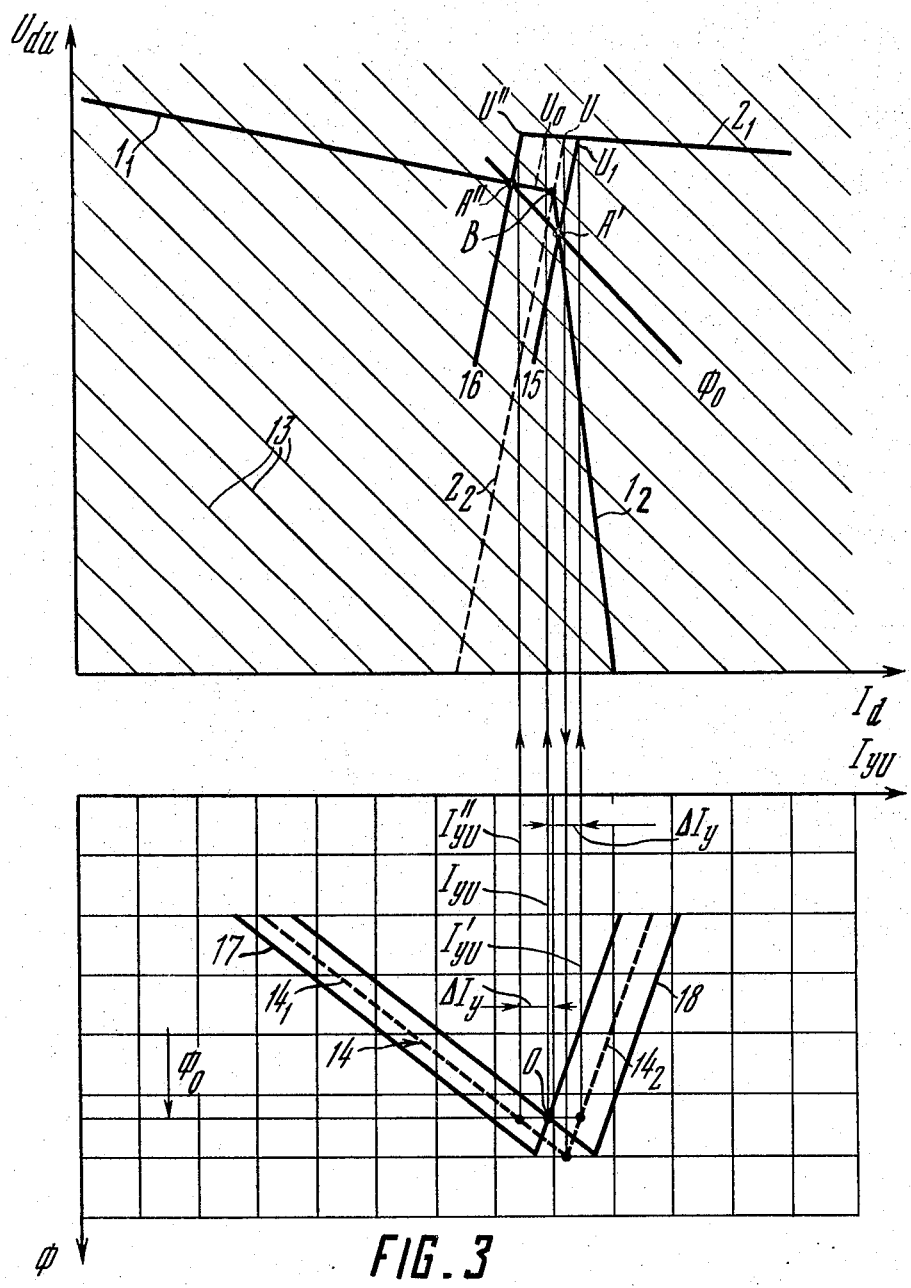

Consider now a case when the predetermined current value is maintained at the rectifier substation, whereas an extreme value of the controlled variable is maintained at the inverter substation. FIG. 3 shows a broken line 1 with portions $1_1$ and $1_2$, representing the external characteristic $V'_{dB}(I_d)$ of both half circuits of the rectifier substation, applied to the d.c. terminals of the inverter so that $V'_{dB} = V_{dU}$ at a certain value of the current setting value $I_{yB}$ of the rectifier substation and of its e.m.f. The external characteristics of the rectifier substation half circuits are identical and matched with each other. The broken line 2 with portions $2_1$ and $2_2$ represents the external characteristics $V_{dU}(I_d)$ of the half circuits of the inverter substation with a current regulator; as in the case of the rectifier substation, the characteristics of both half circuits are matched.

The controlled variable $\phi$ is formed according to (1) with $K_V = 1$ and $K_1 = 1$. FIG. 3 shows lines 13 corresponding to equal values of the controlled variable ($\phi$ = const). The broken line 14 with portions $14_1$ and $14_2$ characterizes the values of the controlled variables of the inverter substation half circuits as a function to the current setting $I_{yU}$ of that substation.

The external characteristics of the inverter substation half circuits are shifted by $\Delta I_y$ with the following ratio between the current settings of the inverter half circuits:

$$I'_{yU} = I_{yU} + \Delta I_y \quad (4)$$
$$I''_{yU} = I_{yU} - \Delta I_y,$$

where $I'_{yU}$ is the current setting of the first half circuit of the inverter substation;

$I''_{yU}$ is the current setting of the second half circuit of the inverter substation;

$I_{yU}$ is the current setting of the inverter substation; and $\Delta I_y$ is a constant selected so that $I_{yU} > > I_y > 0$.

As a result of the shift and in accordance with Equation (4), the external characteristic of the inverter substation for the current setting $I_{yo}$ (the salient point $U_o$) is as represented by broken lines 15 and 16, the broken line 15 representing the characteristic of the first half circuit, whereas the broken line 16 represents the characteristic of the second half circuit of the inverter substation. The relations between the controlled variables $\phi'$ and $\phi''$ of the inverter half circuits and the current setting $I_{yU}$ are represented by broken lines 17 and 18, respectively; the sign of the difference $\phi = \phi' - \phi''$ unambiguously points to the position of the extreme value of $\phi$.

At $\Delta\phi > 0$, the current setting of the inverter substation is increased, whereas at $\Delta\phi < 0$, the current setting is reduced. With this type of control, the point of equilibrium of the system is the point 0 of intersection of the extreme relations of $\phi'$ and $\phi''$. A' is the working point corresponding to the point D for the first half circuit, A'' is the working point corresponding to the point 0 for the second half circuit. The points A' and A'' are on the same line representing equal magnitudes of the controlled variables of the half circuits, determined by the projection of the point 0 on the y-axis. This method makes it possible to reach a current setting value of the inverter substation close to the optimum value without any search for an optimum solution of the problem, whereby a maximum operating speed is ensured.

A similar type of control can be carried out by shifting the external characteristics of the rectifier substation half circuits with reference to current settings and a minimum closing angle, while maintaining the value $I'_{yU} = I''_{yU} = I_{yU}$ at the inverter substation. It must be apparent to all skilled in the art that the idea is to control the rectifier substation, while maintaining a predetermined current value at the inverter substation. The controlled variable $\phi$ is formed in this case at the rectifier substation in accordance with Equations (1), (2) or (3), whereafter an extreme value of $\phi$ is maintained. This type of control features all the above-mentioned advantages.

Consider now the way the proposed method for controlling operating conditions of a DC transmission line is carried out with the use of one of the preferred embodiments of the control device according to the invention. A predetermined current value is assumed to be maintained at the rectifier substation, while an extreme value of the controlled variable $\phi$ is maintained at the inverter substation.

Figure 4:
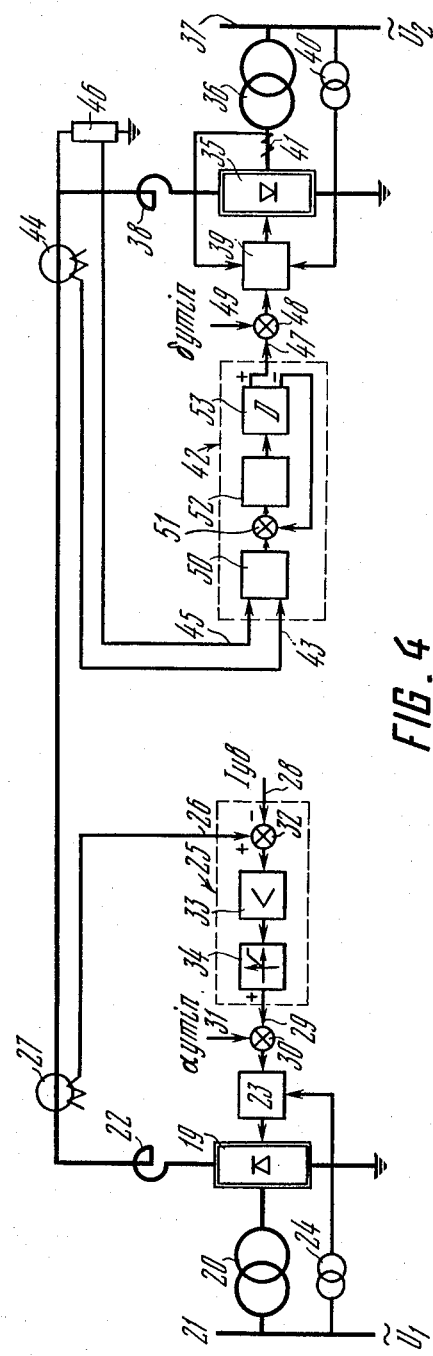
FIG. 4 is a key diagram of a unipolar DC transmission line in accordance with the invention.

FIG. 4 is a diagram of a unipolar DC transmission line.

The rectifier substation of the DC transmission line comprises a gate bridge 19 connected through the gate and network windings of a transformer 20 to AC bus bars 21 of the sending system (not shown). A line reactor 22 is placed in the rectified current circuit. The rectifier substation further includes a system 23 for phase control of the closing angle of the gates of the bridge 19. The system 23 is connected to a measuring a.c. voltage transformer 24. The rectifier substation further includes a current regulator 25. Applied to a first input 26 of said current regulator 25 is a DC signal arriving from a DC transformer 27 placed in the rectified current circuit, whereas a second input 28 of the current regulator 25 receives a current setting signal $I_{yB}$ for setting current at the substation.

The current setting $I_{yB}$ may be effected manually or automatically, for example, with the aid of a power controlled unit (not shown).

An output of the current regulator 25 is connected to an input 29 of a closing angle setting means 30 whose output is connected to an input of the phase control system 23. Applied to a second input 31 of the closing angle setting means 30 is a signal corresponding to the setting of the closing angle $\alpha_{min}$ of the rectifier substation. The current regulator 25 comprises an error element 32 whose inputs serve as the inputs 28 and 26 of the current regulator 25, an amplifier 33 and a limiter 34. The error element 32, amplifier 33 and limiter 34 are placed in series. The characteristic of the limiter 34 is selected so that the closing angle setting can only increase with respect to $\alpha_{min}$.

The inverter substation comprises a gate bridge 35 and a conversion transformer 36 connected with its network windings to AC bus bars of the receiving system (not shown) and with its gate windings, to the gate bridge 35. The inverter substation further includes a line reactor 38 placed in the rectified current circuit, and a system 39 for phase control of the closing or quenching angles of the gates of the bridge 35. The system 39 is connected to a measuring AC voltage transformer 40 and a measuring AC transformer 41 placed in the gate winding circuit of the conversion transformer 36.

The inverter substation further includes an optimizing controller 42 whose first input 43 is connected to a DC transformer 44 of the inverter substation, whereas its second input 45 is connected to a high voltage divider 46 interposed between the pole and ground of the substation and intended to measure the rectified voltage.

The transformer 44 and voltage divider 46 serve as a current transducer and a voltage transducer, respectively.

An output of the optimizing controller 42 is connected to an input 47 of a means 48 for setting the quenching angle $\delta_y$ of the gates of the bridge 35. A second input 49 of the means 48 receives a signal proportional to a minimum permissible angle $\delta_{ymin}$.

The optimizing controller 42 is adjusted so that it only increases the setting of the quenching angle $\delta_y$ with respect to $\delta_{ymin}$. The controller 42 comprises a controlled variable former 50 whose inputs are the inputs 43 and 45 of said optimizing controller 42, an adder 51 having one of its inputs connected to an output of the former 50, an automatic controlled variable optimizer 52 connected to an output of the adder 51, and a control action discriminator 53 having its input connected to an output of the optimizer 52, whereas its outputs are connected to a second input of the adder 51 and the input 47 of the quenching angle setting means 48.

The former 50 of a controlled variable, formed on the basis of operating parameters of the inverter substation in accordance with one of the aforementioned Equations (1) or (3), is connected with one of its inputs to the d.c. voltage transducer, i.e. the divider 46; when operating according to Equation (2), said input of the former 50 is connected to a quenching angle transducer of the substation. The former 50 is connected to the divider 46, as shown in FIG. 4.

In its simplest form, the former 50 is an adder. The former 50 and adder 51 may be combined into a common adder unit.

The automatic optimizer 52 is intended to maintain a maximum or minimum value of the controlled variable. Its function may be performed, for example, by the single-channel proportional step optimizer (cf. L. A. Rasstrighin, Systemy extremalnogo upravleniya/Optimizing Control Systems/,Moscow, 1974, pp. 582–586).

The control action discriminator 53 is intended to confine the control action of the controller 42 within prescribed limits, to detect cases when a signal arriving from the output of the optimizer 52 exceeds a prescribed level, and to discriminate a value proportional to the excess at a separate output.

According to one of the preferred embodiments of the invention, a closing angle or a closing angle setting are applied to the input of the controlled variable former 50, in which case the input of the former 50 is connected to a closing angle transducer of the substation (not shown) incorporated in the system for phase control of the substation closing angle.

The control device according to the invention, intended for controlling operating conditions of a DC transmission line, operates as follows.

The rapid-action current regulator 25 either sets the current through the transmission line at a level equal to the predetermined value or sets the closing angle of the gate bridge 19 at a minimum value $\alpha_{ymin}$, depending on the actual ratio between the voltages across the AC bus bars 21 and 37 of the sending and receiving systems, respectively, and the rectified voltage at the inverter substation. The controller 42 searches and sets an optimum quenching angle of the inverter substation, at which the current of the transmission line is equal to the value set at the rectifier substation, and at which the voltage is at its maximum.

There may be two modes of operation.

If the actual operating conditions of the sending and receiving systems and the transmission line are such that the optimum quenching angle of the inverter substation is less than the minimum permissible value, the optimizer sets an extreme value at the output of the former 50, acting through the object of control.

Let it be assumed that the initial quenching angle of the inverter substation is less than the optimum, but greater than the minimum permissible angle, i.e. the working point is within the portion $\alpha=\alpha_{min}=$const of the external characteristic of the rectifier substation. In such a case, a signal arriving from the optimizer is a positive signal across the output of the discriminator 53 connected to quenching angle setting means 48; meanwhile, there is no signal at the second output of the discriminator 53. The controller 42 increases the quenching angle of the inverter substation because the controlled variable increases due to an increase in the current and decrease in the voltage, which, in turn, are due to an increased quenching angle. As the current reaches the current setting value of the rectifier substation, any further increase of the current can only reduce the voltage because the current regulator of the rectifier substation eliminates excessive current by reducing the voltage. As a result, there is a decrease in the controlled variable at the output of the former 50, which causes a reversal in the steps of the optimizer 52. Upon finding the exact point of the extreme, the operation of the optimizer is discontinued.

If the actual operating conditions are such that the optimum quenching angle of the inverter substation is less than the minimum permissible angle, the optimizer 52 sets the minimum permissible quenching angle, whereupon it tends to further reduce said angle, whereby operation is carried out in the region of negative values of the output signal. As this takes place, the discriminator 53 disconnects the optimizer 52 from the substation. The signal from the optimizer 52 arrives at that output of the discriminator 53 which is connected to the adder 48.

From the output of the discriminator 53, the signal is applied to the adder 51. The polarity of the signal is such that the output signal of the former 50, applied to the input of the optimizer 52, is reduced if the optimizer acts to maintain the controlled variable $\phi$ at its maximum; at the same time the output signal of the former 50 is reduced if said former functions to maintain the controlled variable $\phi$ at a minimum. Thus, the negative feedback of the controller 42 makes it possible to maintain the output signal of the optimizer 52 at a peak of the control capacity of the controller and the substation.

Figure 5:
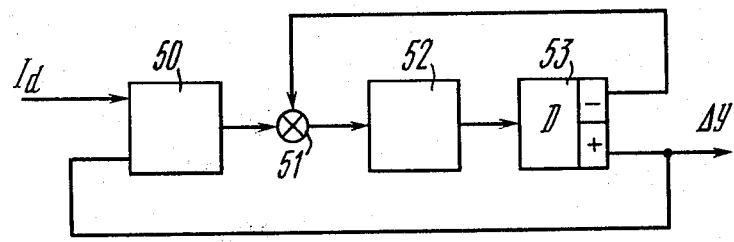
FIG. 5 is a diagram of an optimizing controller in accordance with the invention.
Figure 6:
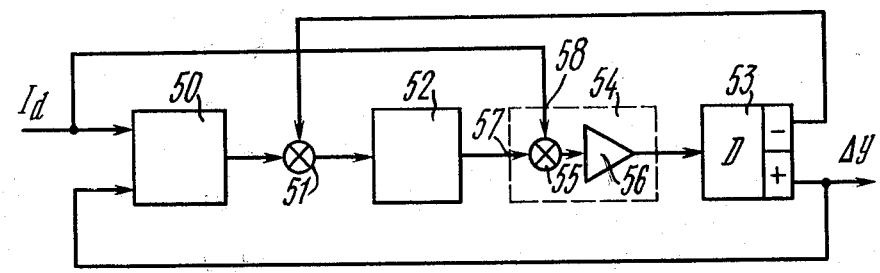
FIG. 6 is a diagram of an optimizing controller including a current stabilizing unit, in accordance with the invention.
Figure 7:
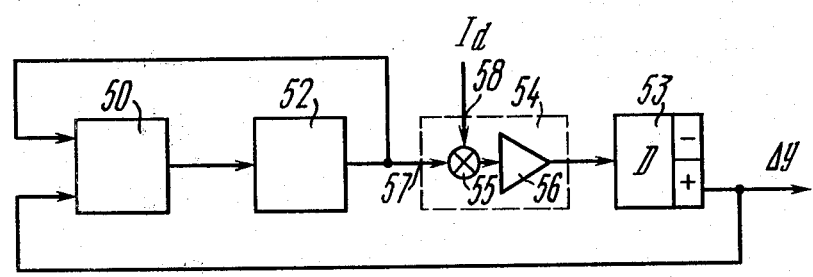
FIG. 7 is a diagram of an alternative embodiment of an optimizing controller in accordance with the invention.

FIGS. 5, 6 and 7 show preferred embodiments of the controller 42.

The output of the discriminator 53 (FIG. 5), which also serves as the output of the controller 42, is connected to one of the inputs of the controlled variable former 50 whose second input receives a signal from a DC transducer (not shown) of the substation. The former 50 synthesizes the controlled variable $\phi$ in accordance with Equation (2), whereby use is made of a control action equal to the difference between the closing angle setting of the substation and a minimum permissible value of that angle.

The optimizing controller of FIG. 6 includes a current stabilizing unit 54 which comprises a comparator 55 and an error amplifier 56. A current setting input 57 of the unit 54 is connected to the output of the optimizer 52; a current input 58 of the unit 54 is combined with the input of the former 50 which is connected to the DC transducer of the substation.

An output of the current stabilizing unit 54 is connected to the input of the control action discriminator 53. The gain factor of the amplifier 56 may be nonlinear. According to this embodiment, the output signal of the automatic optimizer 52 corresponds to the current setting of the substation.

Unlike the embodiment of FIG. 6, FIG. 7 shows an optimizing controller, wherein the current input of the former 50 is connected to the output of the optimizer 52, whereas the output of the former 50 is directly coupled to the input of the optimizer 52. A current input 58 of the unit 54 is connected to the DC transducer of the substation. The former 50 forms the controlled variable $\phi$ in accordance with Equation (2) and on the basis of the current settings and the closing angle of the substation.

Figure 8:
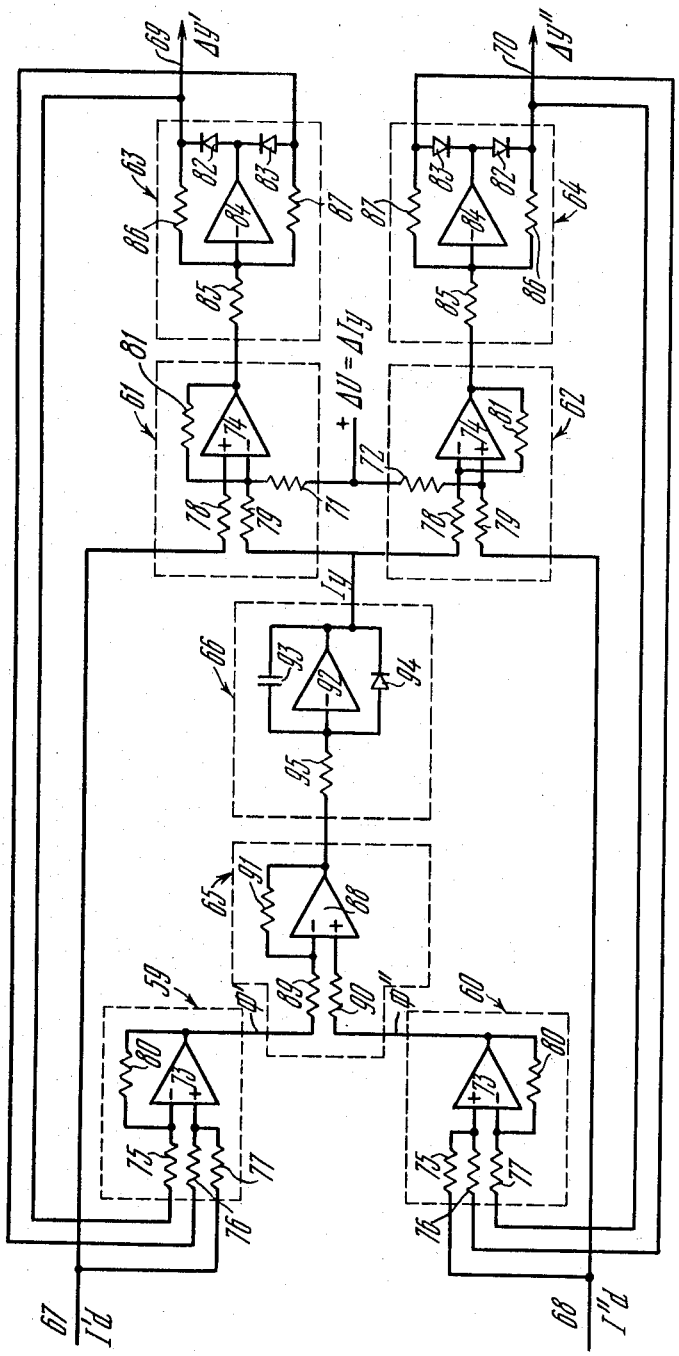
FIG. 8 is a diagram of an optimizing controller intended to control operating conditions of a bipolar DC transmission line, in accordance with the invention.

FIG. 8 is a diagram of a control device intended for controlling operating conditions of a bipolar DC transmission line. In the two half circuits, the device comprises controlled variable formers 59 and 60, respectively, current stabilizing units 61 and 62, respectively, and control action discriminators 63 and 64, respectively. The device further includes an adder 65 and a substation current setting former 66, which are common for both half circuits.

Inputs 67 and 68 of the device of FIG. 8 are connected to the DC transducer of the substation. Outputs 69 and 70 of the device of FIG. 8 are connected to the substation closing angle setting means of the first and second half circuits, respectively.

From the DC transducers of the half circuits, signals are applied to the inputs 67 and 68 as DC voltage of positive polarity; as a result, voltage signals of positive polarity are produced at the outputs 69 and 70.

The characteristics of the half circuits are shifted by applying a common signal $\Delta V < 0$ to inputs 71 and 72 of the units 61 and 62, respectively, which signal arrives from a voltage source (not shown). In the first half circuit, this signal is added to the signal corresponding to the current setting which is also greater than zero; in the second half circuit, the signal is subtracted from a similar signal.

The controlled variables $\phi'$ and $\phi''$ of the two half circuits are differences of values proportional to the current and the control action by the device on the respective half circuit.

The formers 59 and 60 and units 61 and 62 of the first and second half circuits, respectively, are similar to each other, each being built around operational amplifiers 73 and 74, respectively. The amplifiers 73 and 74 comprise input resistors 75, 76, 77 and 78, 79 and resistors 80 and 81 connected in their feedback loops, respectively.

The discriminators 63 and 64 of the two half circuits are also identical, each comprising diodes 82 and 83 and an operational amplifier 84 including resistors 85 and resistors 86 and 87 connected in its feedback loop.

The adder 65, which is common for both half circuits, comprises an operational amplifier 88 with input resistors 89 and 90 and a resistor 91 placed in its feedback loop. ;p In order to raise the accuracy of control, the current setting former 66 of the substation is constructed as an integrator built around an operational amplifier 92 including a capacitor 93 and a diode 94 in its feedback loop, and also an input resistor 95.

The device of FIG. 8 is to be installed at the inverter substation. In this case, the signals from the current transducers of the half circuits are applied to the inputs 67 and 68 as DC voltage of positive polarity; the means for setting the closing angles of the half circuits increase the settings upon the arrival of voltage signals of positive polarity at the outputs 69 and 70 of the controller.

Consider now operation of the device according to the invention for the case when $I_d > I_{pU}$. The case is illustrated in FIG. 1a.

Under such conditions, there are signals of negative polarity at the outputs of the current stabilizing units. These signals are inverted by the amplifiers 84 of the control action discriminators 63 and 64 and discriminated at the positive outputs of the discriminators 63 and 64, connected to the diodes 82. Meanwhile, there are no signals at the other outputs of the discriminators 63 and 64, connected to the diodes 83.

Let it be assumed that the current setting $I_y$ produced by the former 66 is such that the working points of the half circuits are found on the portions 1 of the half circuits characteristic of the rectifier substation. The current through the first half circuit is higher than the current through the second half circuit, but the signals at the outputs 69 and 70 are about equal because within the portion 1 of the rectifier characteristic significant changes in the current are brought about by small variations in the closing angles. As a result, the signal of the controlled variable former 59 is more positive (or less negative) than the signal of the former 60; the signal at the output of the adder 65 is negative; the integrator of the former 66 increases the magnitude of its output signal, i.e. the current setting of the substation, bringing it closer to the current setting value of the rectifier substation.

If the initial value of the current setting $I_y$ is such that the working points of the half circuits are found on the portions 1 of the characteristic of the half circuits of the rectifier substation, the currents through the half circuits are roughly equal due to equal current settings of the half circuits; the signal at the output 69 is greater in magnitude than the signal at the output 70 due to different current settings of the inverter substation half circuits. As a result, the output signal of the former 59 is less positive (or more negative) than the signal of the former 60; the signal at the output of the adder 65 is positive; the integrator of the former 66 reduces the value of its positive output signal and thus brings the current setting of the inverter substation closer to the current setting of the rectifier substation. The integrator discontinues the integration process only when the signal at the output of the adder 65 is zero and when the signals of the controlled variable formers 59 and 60 of the two half circuits are equal, which is only possible when the working point of the first half circuit is within the portion $1_2$ of the characteristic of the first half circuit of the rectifier substation, and when the working point of the second half circuit is within the portion $1_1$ of the characteristic of the second half circuit. A change in the current setting of the rectifier substation in any direction disturbs the balance between the signals of the formers 59 and 60 and again brings the integrator of the former 66 into action.

In case of a decrease in the d.c. voltage of the sending system due to short-curcuiting, the control device invariably increases the current setting at the inverter substation and thus prevents an interruption of the transmission. An increase in the current setting of the inverter substation is due to the fact that the working points of both half circuits are on portions 1 of the characteristic of the rectifier substation half circuits.

Consider operation of the control device according to the invention for the case, when $I_d > I_{yU}$. In this case the working points of the half circuits of the transmission line are within portions $2_1$ of the characteristics of the inverter substation half circuits. There are positive signals at the outputs of the current stabilizing units 61 and 62, which signals are discriminated at the negative outputs of the discriminators 63 and 64, connected to the diodes 83; the signals at the outputs 69 and 70 of the controller are zero. The currents of the two half circuits are equal, being determined by the equal current settings of the rectifier substation half circuits. As a result, the signal of the discriminator 63 is less negative than the signal of the discriminator 64, whereas the signal of the former 59 is more positive (or less negative) than the signal of the former 60.

Under such conditions, the output signal of the adder 65 is negative, and the integrator increases the positive value of the signal at the output of the former 66, thus increasing the current setting of the inverter substation and bringing it into correspondence with the value of the current setting of the rectifier substation.

In order to make it possible to use the control device of FIG. 8 at the rectifier substation, it is necessary that the current signal should be applied to the inverting input of the operational amplifier 74; the current setting signal and the shift signal should be applied to the follower input of the amplifier 74; simultaneously, the output signal of the former 59 is applied to the follower input of the amplifier 88, and the signal of the former 60 is applied to the inverting input of the amplifier 88 of the adder 65.

The invention provides for effective control of operating conditions of a DC transmission line without resorting to a telecommunication channel. The invention provides for optimum operating conditions, a maximum possible voltage and a minimum consumption of reactive power from the branch DC systems.

The use of the present invention reduces power losses in DC transmission lines and branch systems, improves operating reliability of DC transmission lines and helps to cut down the costs involved in the construction and maintenance of long-range communication lines between substations.

The control device according to the invention permits the reduction of the rated firing lag angle of the rectifier substation to about 5 electrical degrees, which decreases the reactive power consumption by 10 to 15 percent and raises the voltage of the transmission line by about 1 percent.

What is claimed is:

1. A method of controlling operating conditions of a DC transmission line including a rectifier substation and an inverter substation, said method comprising the steps of maintaining a predetermined current value at the rectifier substation by controlling the voltage at said rectifier substation to decrease said voltage when the current at said rectifier substation increases above the predetermined value and to increase said voltage when said current decreases; and controlling the voltage at the inverter substation to maintain an extreme value of a controlled variable formed as a function of parameters based on operating parameters of said inverter substation thereby insuring a maximum possible voltage at said inverter substation while maintaining the predetermined current value when the extreme value is reached.

2. A method as claimed in claim 1, wherein said inverter substation has a current setting and the voltage at said inverter substation is controlled by varying the current setting.

3. A method as claimed in claim 1, wherein the controlled variable is a sum total of values proportional to the current and voltage at said inverter substation.

4. A method as claimed in claim 1, wherein said inverter substation includes gates having a quenching angle and the controlled variable is a sum total of values proportional to the current of said inverter substation and the quenching angle of the gates of said inverter substation.

5. A method as claimed in claim 1, wherein the controlled variable is a sum total of values proportional to the power and voltage at said inverter substation.

6. A method as claimed in claim 1, wherein said inverter substation includes gates having a quenching angle and a setting of the quenching angle and the controlled variable is a sum total of values proportional to the current and the setting of said quenching angle of the gates of said inverter substation.

7. A method as claimed in claim 3, wherein the controlled variable as a sum total of values proportional to the current and voltage of said inverter substation.

8. A method as claimed in claim 3, wherein said inverter substation includes gates having a closing angle and the controlled variable is a sum total of values proportional to the current of said inverter substation and the closing angle of the gates of said inverter substation.

9. A method as claimed in claim 3, wherein said inverter substation includes gates having a closing angle and a setting of the closing angle and the controlled variable is a sum total of values proportional to the current and said setting of said closing angle of the gates of said inverter substation.

10. A method as claimed in claim 3, wherein the controlled variable is a sum total of values proportional to the power and voltage of said inverter substation.

11. A method of controlling operating conditions of a DC transmission line including an inverter substation and a rectifier substation, said method comprising the steps of maintaining a predetermined current value at the inverter substation by controlling the voltage of said inverter substation to increase the voltage of said inverter substation when the current of said inverter substation exceeds the predetermined value and to decrease said voltage when said current decreases; and controlling the voltage at the rectifier substation to maintain an extreme value of a controlled variable formed as a function of parameters based on operating parameters of said rectifier substation thereby insuring a maximum possible voltage at said rectifier substation while maintaining the predetermined current value when the extreme value is reached.

12. A method as claimed in claim 11, wherein said rectifier substation has a current setting and the voltage at said rectifier substation is controlled by varying the current setting.

13. A method as claimed in claim 11, wherein the controlled variable is a sum total of values proportional to the current and voltage of said rectifier substation.

14. A method as claimed in claim 11, wherein said rectifier substation includes gates having a quenching angle and the controlled variable is a sum total of values proportional to the current of said rectifier substation and the quenching angle of the gates of said rectifier substation.

15. A method as claimed in claim 11, wherein said rectifier substation has a current setting and includes gates having a quenching angle and a setting of the quenching angle and the controlled variable is a sum total of values proportional to the current setting at said rectifier substation and to the setting of said quenching angle of the gates of said rectifier substation.

16. A method as claimed in claim 11, wherein the controlled variable is a sum total of values proportional to the power and voltage of said rectifier substation.

17. A method as claimed in claim 12, wherein the controlled variable is a sum total of values proportional to the current and voltage of said rectifier substation.

18. A method as claimed in claim 12, wherein said rectifier substation includes gates having a closing angle and the controlled variable is a sum total of values proportional to the current of said rectifier substation and the closing angle of the gates of said rectifier substation.

19. A method as claimed in claim 12, wherein said rectifier substation has a current setting and includes gates having a closing angle and a setting of the closing angle and the controlled variable is a sum total of values proportional to the current setting and said setting of said closing angle of the gates of said rectifier substation.

20. A method as claimed in claim 12, wherein the controlled variable is a sum total of values proportional to the power and voltage of said rectifier substation.

21. A method of controlling operating conditions of a bipolar DC transmission line including a rectifier substation having control half circuits and an inverter substation having control half circuits, said method comprising the steps of maintaining, in each control half circuit of the rectifier substation, a predetermined current value at said rectifier substation by controlling the voltage of said rectifier substation to decrease said voltage when the current at said rectifier substation exceeds the predetermined value and to increase said voltage when said current decreases; and controlling the voltage at the inverter substation to maintain an extreme value of a controlled variable formed for each control half circuit of said inverter substation as a function of parameters based on operating parameters of said inverter substation thereby insuring a maximum possible voltage in each control half circuit of said inverter substation while maintaining the predetermined current value when the extreme value is reached.

22. A method of controlling operating conditions of a bipolar DC transmission line including an inverter substation having control half circuits and a rectifier substation having control half circuits, said method comprising the steps of maintaining, in each control half circuit of the inverter substation, a predetermined current value at said inverter substation by controlling the voltage of said inverter substation to increase said voltage when the current at said inverter substation exceeds the predetermined value and to decrease said voltage when said current decreases; and controlling the voltage at the rectifier substation to maintain an extreme value of a controlled variable formed for each control half circuit of said rectifier substation as a function of parameters based on operating parameters of said rectifier substation thereby insuring a maximum possible voltage in each control half circuit of said rectifier substation while maintaining the predetermined current value when the extreme value is reached.

23. A method as claimed in claim 21, wherein said transmission line operates at equal loads of its control half circuits and the control half circuits of said inverter substation have external characteristics and the extreme value of the controlled variable is maintained by shifting the external characteristics of said control half circuits of said inverter substation by a specific constant value, comparing the controlled variables formed for said control half circuits and utilizing the negative feedback on the difference between said controlled variables, taking into account the shifting of said external characteristics.

24. A method as claimed in claim 22, wherein said transmission line operates at equal loads of its control half circuits and the control half circuits of said rectifier substation have external characteristics and the extreme value of the controlled variable is maintained by shifting the external characteristics of said control half circuits of said inverter substation by a specific constant value, comparing the controlled variables formed for said control half circuits and utilizing the negative feedback on the difference between said controlled variables, taking into account the shifting of said external characteristics.

25. A DC transmission line having a gate type rectifier substation including steps with a closing angle, a device for controlling the phase of the closing angle of the gates of the rectifier substation, a gate type inverter substation including gates with a quenching angle, a device for controlling the phase of the quenching angle of the gates of the inverter substation, a current transducer for the rectifier substation and a current transducer for the inverter substation, said DC transmission line including
   a source of a signal corresponding to a second parameter characterizing the rectified voltage;
   an optimizing controller at one of said substations, said optimizing controller comprising a controlled variable former having a first input connected to the current transducer of said one of said substations, a second input being supplied with the signal corresponding to a second parameter characterizing the rectified voltage, and an output providing a signal formed as a function based on operating parameters of said one of said substations;
   an adder having a first input connected to the output of said controlled variable former, a second input and an output;
   an automatic controlled variable optimizer having an input connected to the output of said adder and an output providing an optimum signal at which said function based on operating parameters reaches its extreme value corresponding to a maximum possible voltage at a predetermined current value; and
   a control action discriminator having an input connected to the output of the automatic controlled variable optimizer, a first output connected to the second input of said adder, and a second output connected to said device for controlling the phase of the closing angle of the gates of said one of said substations.

26. A DC transmission line as claimed in claim 25, wherein the second output of said control action discriminator is connected to the second input of said controlled variable former.

27. A DC transmission line as claimed in claim 25, further comprising a voltage transducer for said rectifier substation and a voltage transducer for said inverter substation, and wherein the second input of said controlled variable former is connected to the voltage transducer of said one of said substations.

28. A DC transmission line as claimed in claim 25, wherein the second input of said controlled variable former is connected to said device for controlling the phase of the closing angle of the gates of said one of said substations whereby a signal corresponding to the quenching angle of the gates of said one of said substations is applied to said second input of said controlled variable former.

29. A DC transmission line as claimed in claim 25, wherein said optimizing controller further comprises a current stabilizing unit having a current input connected to the first input of said controlled variable former, a current setting input connected to the output of said automatic controlled variable optimizer, and an output connected to the input of said control action discriminator.

30. A DC transmission line as claimed in claim 26, wherein said optimizing controller further comprises a current stabilizing unit having a current input connected to the first input of said controlled variable former, a current setting input connected to the output of said automatic controlled variable optimizer, and an output connected to the input of said control action discriminator.

31. A DC transmission line as claimed in claim 27, wherein said optimizing controller further comprises a current stabilizing unit having a current input to the first input of said controlled variable former, a current setting input connected to the output of said automatic controlled variable optimizer, and an output connected to the input of said control action discriminator.

32. A DC transmission line as claimed in claim 28, wherein said optimizing controller further comprises a current stabilizing unit having a current input connected to the first input of said controlled variable former, a current setting input connected to the output of said automatic controlled variable optimizer, and an output connected to the input of said control action discriminator.

33. A DC transmission line as claimed in claim 29, wherein said controlled variable former has a current input connected to the output of said automatic controlled variable optimizer and the output of said controlled variable former is connected to the input of said automatic controlled variable optimizer.

34. A bipolar DC transmission line having a gate type rectifier substation with two control half circuits, each of the control half circuits of the rectifier substation including gates with a closing angle and a device for controlling the phase of the closing angle of the gates of the rectifier substation, a gate type inverter substation with two control half circuits, each of the control half circuits of the inverter substation including gates with a quenching angle and a device for controlling the phase of the quenching angle of the gates of said inverter substation, a current transducer in each of the control half circuits of said rectifier substation and a current transducer in each of the control half circuits of said inverter substation, said bipolar DC transmission line including
   a source of a signal corresponding to a second parameter characterizing the rectified voltage of one of the control half circuits of one of said substations;
   a pair of optimizing controllers each in a corresponding one of the control half circuits of said one of said substations, each of said optimizing controllers comprising a controlled variable former having a first input connected to the current transducer of said one of said control half circuits of said one of said substations, a second input being supplied with the signal corresponding to a second parameter characterizing the rectified voltage of said one of said control half circuits of said one of said substations, and an output providing a signal formed as a function based on operating parameters of said one of said control half circuits of said one of said substations;

an adder having a first input connected to the output of said controlled variable former, a second input and an output;

an automatic controlled variable optimizer having an input connected to the output of said adder and an output providing an optimum signal at which said function based on operating parameters reaches its extreme value corresponding to a maximum possible voltage at a predetermined current value; and a control action discriminator having an input connected to the output of the automatic controlled variable optimizer, a first output connected to the second input of said adder, and a second output connected to said device for controlling the phase of the closing angle of the gates of said one of said control half circuits of said one of said substations.

35. A bipolar DC transmission line as claimed in claim 34, wherein in each of said control half circuits the second output of said control action discriminator is connected to the second input of said controlled variable former.

36. A bipolar DC transmission line as claimed in claim 34, further comprising a voltage transducer for said rectifier substation and a voltage transducer for said inverter substation, and wherein the second input of said controlled variable formers of said control half circuits are connected to the voltage transducer of said one of said substations.

37. A bipolar DC transmission line as claimed in claim 34, wherein the second input of each of said controlled variable formers is connected to said device for controlling the phase of the closing angle of the gates of said one of said substations whereby a signal corresponding to the quenching angle of the gates of said one of said substations is applied to said second input of said controlled variable formers.

38. A bipolar DC transmission line as claimed in claim 34, wherein each of said optimizing controllers further comprises a current stabilizing unit having a current input connected to the first input of said controlled variable former, a current setting input connected to the output of said automatic controlled variable optimizer, and an output connected to the input of ssaid control action discriminator.

39. A bipolar DC transmission line as claimed in claim 35, wherein each of said optimizing controllers further comprises a current stabilizing unit having a current input connected to the first input of said controlled variable former, a current setting input connected to the output of said automatic controlled variable optimizer, and an output connected to the input of said control action discriminator.

40. A bipolar DC transmission line as claimed in claim 36, wherein each of said optimizing controllers further comprises a current stabilizing unit having a current input connected to the first input of said controlled variable former, a current setting input connected to the output of said automatic controlled variable optimizer, and an output connected to the input of said control action discriminator.

41. A bipolar DC transmission line as claimed in claim 37, wherein each of said optimizing controllers further comprises a current stabilizing unit having a current input connected to the first input of said controlled variable former, a current setting input connected to the output of said automatic controlled variable optimizer, and an output connected to the input of said control action discriminator.

42. A bipolar DC transmission line as claimed in claim 38, wherein said controlled variable former of each of said optimizing controllers has a current input connected to the output of said automatic controlled variable optimizer and the output of said controlled variable former is connected to the input of said automatic controlled variable optimizer.

43. A bipolar DC transmission line having a gate type rectifier substation with two control half circuits each of the control half circuits of the rectifier substation including gates with a closing angle and a device for controlling the phase of the closing angle of the gates of the rectifier substation, a gate type inverter substation with two control half circuits, each of the control half circuits of the inverter substation including gates with a quenching angle and a device for controlling the phase of the quenching angle of the gates of said inverter substation, a current transducer in each of the control half circuits of said rectifier substation and a current transducer in each of the control half circuits of said inverter substation, said bipolar DC transmission line including a source of a signal corresponding to a second parameter characterizing the rectified voltage of one of the control half circuits of one of said substations;

an optimizing controller in a corresponding one of said substations, said optimizing controller comprising a controlled variable former in each of the control half circuits of said one of said substations, each of said controlled variable formers having a first input connected to the current transducer of said one of said control half circuits of said one of said substations, a second input being supplied with the signal corresponding to a second parameter characterizing the rectified voltage of said one of said control half circuits of said one of said substations, and an output providing a signal formed as a function based on operating parameters of said one of said control half circuits of said one of said substations, said function having an extreme value corresponding to a maximum possible voltage at a predetermined current value of said one of said control half circuits of said one of said substations;

an adder common to both control half circuits of said one of said substations, said adder having a first input connected to the outputs of said controlled variable formers of said one of said substations, a second input and an output;

a current setting former for said control half circuits, said current setting former having an input connected to the output of said adder and an output providing an output signal having a magnitude and sign;

a source of electrical signals having a magnitude equal to that of said output signal and a sign opposite that of said output signal, said output signal being added to said electrical signals in said one of said control half circuits of said one of said substations;

a plurality of current stabilizing units, each in a corresponding one of said control half circuits, each of said current stabilizing units having a current setting input connected to the output of said current setting former, a current input connected to the first input of said controlled variable former and an output providing a signal; and a plurality of control action discriminators, each in a corresponding one of said control half circuits, each of said control action discriminators having an input connected to the output of the corresponding one of said current stabilizing units, a first output connected to the device for controlling the phase of the closing angle of the gates of said one of said substations, and a second output providing a signal indicating that the signal at the output of the corresponding one of said current stabilizing units is greater than a predetermined value.

* * * * *